United States Patent
Kim et al.

(10) Patent No.: US 11,936,417 B2
(45) Date of Patent: Mar. 19, 2024

(54) TIME-DIVISION DUPLEX ANTENNA APPARATUS

(71) Applicant: KMW INC., Hwaseong-si (KR)

(72) Inventors: Duk Yong Kim, Hwaseong-si (KR); Min Seon Yun, Anyang-si (KR); Bae Mook Jeong, Suwon-si (KR); Chang Seob Choi, Yongin-si (KR); Su Won Lee, Yongin-si (KR)

(73) Assignee: KMW INC., Hwaseong-si (KR)

( * ) Notice: Subject to any disclaimer, the term of this patent is extended or adjusted under 35 U.S.C. 154(b) by 167 days.

(21) Appl. No.: 17/540,286

(22) Filed: Dec. 2, 2021

(65) Prior Publication Data
US 2022/0094386 A1   Mar. 24, 2022

Related U.S. Application Data

(63) Continuation of application No. PCT/KR2020/007308, filed on Jun. 4, 2020.

(30) Foreign Application Priority Data

Jun. 4, 2019  (KR) .......................... 10-2019-0066188
Sep. 9, 2019  (KR) .......................... 10-2019-0111263

(51) Int. Cl.
*H04B 1/44* (2006.01)
*H04B 1/04* (2006.01)
*H04L 5/14* (2006.01)

(52) U.S. Cl.
CPC ............. *H04B 1/44* (2013.01); *H04B 1/0483* (2013.01); *H04L 5/14* (2013.01)

(58) Field of Classification Search
CPC ... H04B 1/38; H04B 1/40; H04B 1/44; H04B 1/54; H04B 1/0483; H04L 5/14; H04L 5/1415; H04L 5/1469; H04L 1/22
See application file for complete search history.

(56) References Cited

U.S. PATENT DOCUMENTS 7,113,778 B2 *  9/2006  Karabinis .............. H04B 7/216
                                                      455/427
10,477,550 B2 * 11/2019 Balteanu ............... H04L 5/1469
(Continued)

FOREIGN PATENT DOCUMENTS

CN         1476188 A        2/2004
CN         1514554 A        7/2004
(Continued)

OTHER PUBLICATIONS

Chinese Office Action dated Jan. 13, 2023 for Chinese Application No. 202080041276.8.
(Continued)

*Primary Examiner* — Quochien B Vuong
(74) *Attorney, Agent, or Firm* — Insight Law Group, PLLC; Seung Lee

(57) ABSTRACT

The present invention relates to a time-division duplex (TDD) antenna apparatus which can reduce signal loss, and thereby minimize the noise figure (NF) of a system and extend uplink coverage of the system, by separating a transmitter circuit from a receiver circuit of the antenna apparatus, and disposing a low noise amplifier (LNA) of the receiver circuit between a reception antenna and a reception filter of the receiver. A time-division duplex antenna apparatus according to an embodiment of the present invention includes: a transmitter which includes at least one transmission antenna module and transmits a downlink signal through a first path; a receiver which includes at least one reception antenna module and receives an uplink signal through a second path that is separated from the first path without any overlapping portions thereof; and a controller which controls the transmitter and the receiver in a time-division duplex manner.

17 Claims, 7 Drawing Sheets

(56) References Cited

U.S. PATENT DOCUMENTS

| 11,094,652 | B1* | 8/2021 | Leong | H04B 1/40 |
|---|---|---|---|---|
| 2008/0119145 | A1* | 5/2008 | Lee | H04B 1/406 |
| | | | | 455/101 |
| 2012/0052819 | A1 | 3/2012 | Sato et al. | |
| 2014/0218248 | A1 | 8/2014 | Schulz et al. | |

FOREIGN PATENT DOCUMENTS

| CN | 1773870 | A | 5/2006 |
|---|---|---|---|
| CN | 103546189 | A | 1/2014 |
| JP | 08-111651 | A | 4/1996 |
| JP | 08-251071 | A | 9/1996 |
| JP | H11-186932 | A | 7/1999 |
| JP | 2019-009744 | A | 1/2019 |
| KR | 10-2006-0088255 | A | 8/2006 |
| KR | 10-0672430 | B1 | 1/2007 |
| KR | 10-1007394 | B1 | 1/2011 |
| WO | 2011/108228 | A | 6/2013 |

OTHER PUBLICATIONS

Notice of Allowance dated Dec. 20, 2022 for Japanese Application No. 2021-539914.
International Search Report dated Sep. 11, 2020 for International Application No. PCT/LKR2020/007308 and its English translation.
Extended European Search Report dated May 4, 2023 from the European Patent Office for European Application No. 20819398.7.

* cited by examiner (a)

(b)

TIME-DIVISION DUPLEX ANTENNA APPARATUS

CROSS-REFERENCE TO RELATED APPLICATIONS

This application is a Continuation of International Application No. PCT/KR2020/007308, filed on Jun. 4, 2020, which claims the benefit of and priority to Korean Patent Application Nos. 10-2019-0066188, filed on Jun. 4, 2019; and 10-2019-0111263, filed on Sep. 9, 2019, the disclosure of which are herein incorporated by reference in their entirety.

TECHNICAL FIELD

The present disclosure relates to a time-division duplex antenna apparatus, and particularly, to a time-division duplex antenna apparatus, which reduces a signal loss and thus minimizes a noise figure (NF) and expands uplink coverage of a system by separating a transmitter circuit and receiver circuit of the antenna apparatus and disposing a low noise amplifier (LNA) of the receiver circuit between a reception antenna and reception filter of the receiver.

BACKGROUND ART

A receiver structure of a conventional antenna apparatus basically includes a signal reception stage, including a reception antenna and a filter, and a signal processing stage including a low noise amplifier (LNA), an AD converter, a digital signal processor (FPGA), etc. For example, a remote radio head (RRH) connected to an antenna and performing the processing of transmission and reception wireless signals may be said to be a representative signal processing stage.

In general, the signal reception stage and the signal processing stage are connected through a cable. The signal reception stage transmits, to the signal processing stage, a reception signal received through a reception antenna and filtered through the cable. The signal processing stage converts, into a digital signal, the reception signal inputted through the cable, processes the digital signal, and then transmits the processed digital signal to an antenna controller.

Meanwhile, a frequency-division duplex (FDD) method and a time-division duplex (TDD) method are used as a method of sharing transmission and reception signals by using one transmission line or antenna.

FIG. 1 is a diagram illustrating a configuration of an antenna apparatus according to a conventional technology. FIG. 1(a) illustrates a configuration of an FDD method antenna apparatus. Referring to FIG. 1(a), when a mobile station, that is, a terminal, and a base station transmit and receive signals, the FDD method antenna apparatus 10 separates a transmission channel and a reception channel and performs communication by using different frequencies through a transmission-side (Tx) filter 15 for signal transmission and a reception-side (Rx) filter 12 for signal reception.

To this end, the FDD method antenna apparatus 10 has a structure in which a power amplifier (PA) 14 on the transmission side is connected to the Tx filter 15, a low noise amplifier (LNA) 13 on the reception side is connected to the Rx filter 12, and the Tx filter 15 and the Rx filter are connected to a single transmission and reception antenna 11. In the case of the FDD method antenna apparatus 10, in a process in which a reception signal received through the transmission and reception antenna is transferred to the signal processing stage through a cable, a signal loss is increased. Specifically, the signal received through the antenna, along with thermal noise, travels through the cable, and signal power thereof is also reduced by a loss of a cable line. Such a loss is increased as the length of the cable is increased. Accordingly, a noise figure (NF) is deteriorated, and the expansion of uplink coverage of a system is limited.

FIG. 1(b) illustrates a configuration of a TDD method antenna apparatus 20. Referring to FIG. 1(b), when a mobile station and a base station transmit and receive signals, the TDD method antenna apparatus 20 uses the same frequency through one filter 22, but separates a transmission signal and a reception signal by making different the times when the transmission signal and the reception signal are used. The TDD method antenna apparatus 20 has a structure in which a power amplifier (PA) 25 on the transmission side and a low noise amplifier (LNA) 24 on the reception side are connected to a switch 23, wherein the switch 23 connects the PA 25 on the transmission side or the LNA 24 on the reception side to the filter 22 connected to a transmission and reception antenna 21.

In the case of the TDD method antenna apparatus 20, a signal loss occurs even in a transmission and reception switch (TDD switch) in addition to a process in which a reception signal received through the transmission and reception antenna 21 is transferred to the signal processing stage through a cable. Accordingly, there are problems in that a noise figure (NF) is deteriorated and the expansion of uplink coverage of a system is limited. As described above, in order to prevent performance deterioration of an antenna apparatus attributable to NF deterioration and the limit of the expansion of uplink coverage, efforts to minimize a signal loss are required.

In base station coverage in mobile communication, a network needs to be designed based on uplink because reception performance of uplink acts as a limiting factor, in particular. A major factor that affects reception performance of uplink is a signal loss from an antenna to an LNA. As a frequency used is increased as in a 5G system, a free space propagation loss is increased in view of the nature of radio waves. Accordingly, base station coverage of uplink is suddenly reduced.

DISCLOSURE

Technical Problem

An object of the present disclosure is to provide a time-division duplex (TDD) antenna apparatus, which can reduce a signal loss and can thus minimize a noise figure (NF) of a system and expand uplink coverage of the system by separating a transmitter circuit and receiver circuit of a time-division duplex (TDD) method antenna apparatus and disposing a low noise amplifier (LNA) of the receiver circuit between a reception antenna and reception filter of the receiver.

Objects of the present disclosure are not limited to the aforementioned object, and the other objects not described above may be evidently understood from the following description by those skilled in the art.

Technical Solution

A time-division duplex antenna apparatus according to an embodiment of the present disclosure for achieving the above object is a time-division duplex (TDD) antenna apparatus transmitting and receiving a downlink signal and an uplink signal according to a time-division duplex (TDD) method, including a transmitter including at least one transmission antenna module and configured to transmit a downlink signal through a first path, a receiver including at least one reception antenna module and configured to receive an uplink signal through a second path separated from the first path without a portion overlapped with the first path, and a controller configured to control the transmitter and the receiver according to the TDD method.

The transmission antenna module may include a power amplifier provided on the first path and configured to amplify power of a transmission signal, a transmission filter provided on the first path and configured to generate the downlink signal by filtering a frequency of the transmission signal amplified by the power amplifier, and at least one transmission antenna provided on the first path and configured to transmit the downlink signal filtered and generated by the transmission filter.

The reception antenna module may include at least one reception antenna provided on the second path and configured to receive the uplink signal, a low noise amplifier provided on the second path and configured to low-noise-amplify the uplink signal received by the reception antenna, and a reception filter provided on the second path and configured to filter a frequency of the uplink signal low-noise-amplified by the low noise amplifier. The low noise amplifier is disposed between the reception antenna and the reception filter along the second path along which the uplink signal is received.

A distance between the reception antenna and the low noise amplifier along the second path may be shorter than a distance between the transmission antenna and the power amplifier along the first path.

The reception antenna module may include the reception antenna in plural. The reception antenna module may further include a combiner provided between the low noise amplifier and the reception filter along the second path and configured to combine a plurality of uplink signals received by the plurality of reception antennas. The low noise amplifier is provided between each of the plurality of reception antennas and the combiner along the second path. The reception antenna module may further include a filter provided between each of the reception antennas and the low noise amplifier along the second path and configured to prevent a saturation of the low noise amplifier. The reception filter may be provided between an output stage of the combiner and the controller along the second path and configured to block an out-of-band signal against a reception signal outputted from the plurality of uplink signals combined by the combiner.

The receiver may include the reception antenna modules in plural. The receiver may further include a Butler matrix provided between the plurality of reception antenna modules and the controller along the second path and configured to form a multi-beam by combining a plurality of reception signals generated by the plurality of reception antenna modules.

The receiver may not include a transmission and reception switch for controlling the transmitter and the receiver according to the TDD method on the second path. The receiver may be composed of a separate circuit separated from the transmitter. The controller may be configured to operate the power amplifier and suspend an operation of the low noise amplifier upon transmission of the downlink signal and to suspend an operation of the power amplifier and operate the low noise amplifier upon reception of the uplink signal.

In this case, the low noise amplifier may be directly connected to an output stage of the reception antenna.

Advantageous Effects

According to the present disclosure, there are effects in that a signal loss can be reduced and thus a noise figure (NF) of a system can be minimized and antenna performance can be improved by separating the transmitter circuit and receiver circuit of the antenna apparatus using a TDD method and disposing the LNA of the receiver circuit between the reception antenna and reception filter of the receiver. Furthermore, there is an effect in that in particular, cell coverage of uplink is improved because an antenna gain is increased due to the minimization of a system NF.

DESCRIPTION OF REFERENCE NUMERALS

Figure 1:
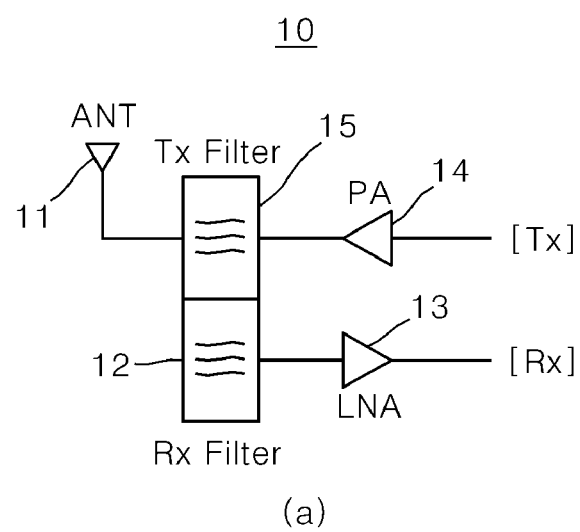
FIG. 1 is a diagram illustrating a configuration of an antenna apparatus according to a conventional technology.
Figure 1:
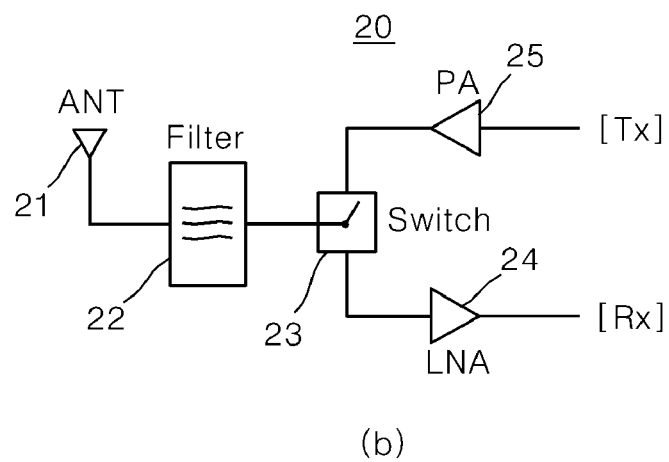

100: time-division duplex antenna apparatus 110: transmitter
110a: transmission antenna module 112: power amplifier
113: isolator 114: transmission filter
115: transmission antenna 116: divider
120: receiver 120a, 120b, 121: reception antenna module
122: reception antenna 123: LNA
124: reception filter 125: signal processing unit
126: AD converter 127: signal processor
128: filter 129: combiner
130: controller 140: Butler matrix

BEST MODE

Hereinafter, some embodiments of the present disclosure will be described in detail with reference to exemplary drawings. In adding reference numerals to the elements of each drawing, it should be noted that the same elements have the same reference numerals as much as possible even if they are displayed in different drawings. Furthermore, in describing embodiments of the present disclosure, when it is determined that a detailed description of the related wellknown configuration or function hinders understanding of an embodiment of the present disclosure, the detailed description thereof will be omitted.

Furthermore, in describing elements of an embodiment of the present disclosure, terms, such as a first and a second, may be used. Such terms are used only to distinguish one component from the other component, and the essence, order, or sequence of a corresponding component is not limited by the terms. All terms used herein, including technical or scientific terms, have the same meanings as those commonly understood by a person having ordinary knowledge in the art to which an embodiment pertains, unless defined otherwise in the specification. Terms, such as those commonly used and defined in dictionaries, should be construed as having the same meanings as those in the context of a related technology, and are not construed as being ideal or excessively formal unless explicitly defined otherwise in the specification.

In this specification, when it is said that one part "includes" an element, the word "include" will be understood to imply the inclusion of stated parts, not the exclusion of other elements, unless explicitly described to the contrary.

A "~ unit" (e.g., a signal processing unit) or a "~er (or or)" (e.g., a controller or a signal processor) used in the specification means a unit for processing at least one function or operation, and the unit may mean software, FPGA or a hardware element, for example. A function provided by "~ unit", "~er (or or)" may be separated and performed by a plurality of elements and may be integrated into another additional element. In the specification, the term "~ unit", "~er (or or)" is not necessarily limited to software or hardware and may be configured to be present in an addressable storage medium or may be configured to play back one or more processors.

A time-division duplex (TDD) antenna apparatus according to an embodiment of the present disclosure is a TDD antenna apparatus transmitting and receiving a downlink signal and an uplink signal according to the TDD method, and is configured to perform the transmission and reception of a downlink signal and an uplink signal according to a TDD method through paths not overlapped between a transmitter and a receiver. The transmitter and the receiver are composed of independent and separate circuits, and are configured to not share a filter for frequency filtering. The receiver may not include at least one of a cable, a filter and a transmission and reception switch (TDD switch) between a low noise amplifier (LNA) and a reception antenna. Accordingly, a signal loss can be reduced because a distance between the reception antenna and the LNA is minimized. Accordingly, a noise figure (NF) of the TDD antenna apparatus can be minimized, and uplink coverage of the TDD antenna apparatus can be expanded.

In the antenna apparatus using the TDD method, an important characteristic of the LNA is a noise figure (hereinafter referred to as an "NF"). The NF is indicated as a signal to noise ratio (SNR) between an input and an output. When the NF of the LNA is high, there is a problem in that a signal having a small level is buried in noise because the noise occurring in the LNA is great.

In order to solve this problem, a level of an input signal needs to be high. In this case, there is a problem in that the number of base stations needs to be increased because the consumption of battery power of a terminal for generating the input signal is increased or cell coverage of the base station is reduced. In particular, in a 5G environment using 3.5 GHz higher than the existing frequency, there are problems in that a propagation loss becomes severe and in particular, cell coverage of uplink is reduced.

The conventional antenna structure illustrated in FIG. 1 has the structure in which the single transmission and reception antenna is connected to the filter, the transmission-side PA and the reception-side LNA are connected to the filter, and a signal received through the antenna is filtered by the filter and then transferred to the LNA.

The greatest factor that influences an NF is a loss. A loss at a front end of an LNA directly deteriorates the NF. Furthermore, the most important portion that determines the NF of the entire system is an NF value at the front portion of a reception unit. Accordingly, when an NF at the front portion of the reception unit is small and a gain thereof is great, the NF of the system is greatly improved.

According to the conventional antenna structure illustrated in FIG. 1, in a process from the antenna to the LNA, a loss occurs in the filter, the cable, and the transmission and reception switch (TDD switch). There is a problem in that the NF of the entire system is deteriorated due to the loss. Accordingly, it is necessary to minimize a loss from the input to the antenna to the front end of the LNA in the reception stage.

Figure 2:
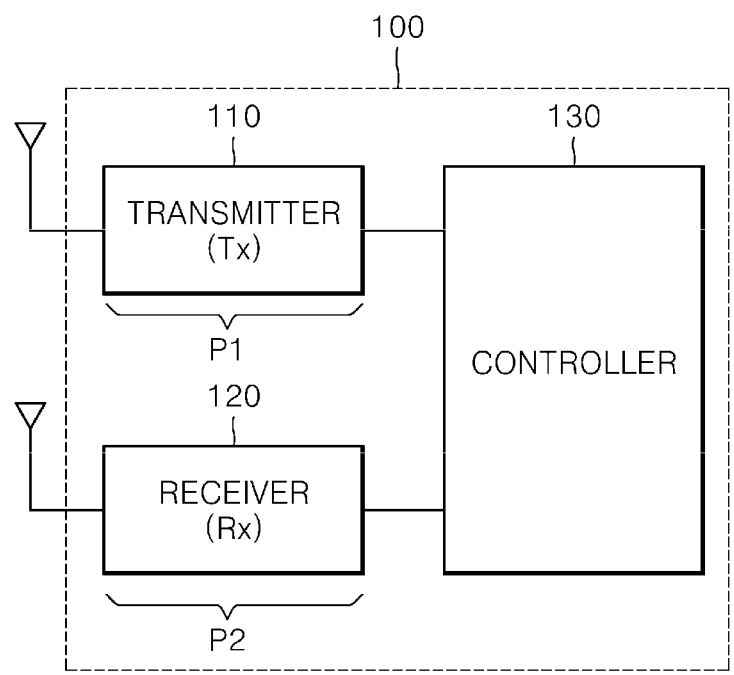
FIG. 2 is a diagram illustrating a configuration of a time-division duplex antenna apparatus according to an embodiment of the present disclosure.
Figure 3:
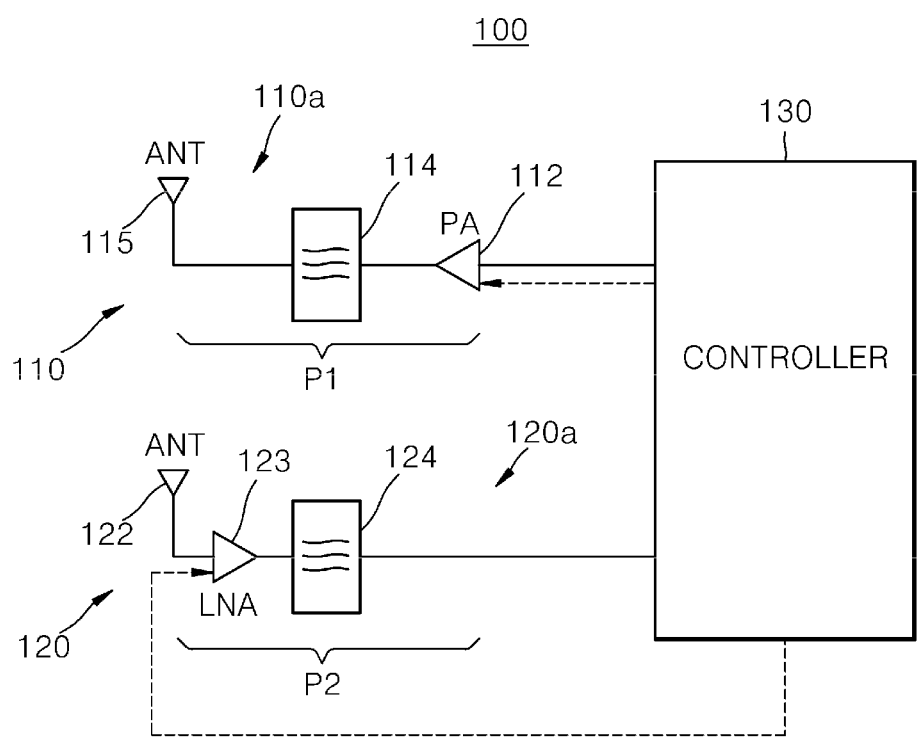
FIG. 3 is a diagram illustrating a transmitter/receiver structure of the time-division duplex antenna apparatus according to an embodiment of the present disclosure.

FIG. 2 is a diagram illustrating a configuration of a TDD antenna apparatus according to an embodiment of the present disclosure. FIG. 3 is a diagram illustrating a transmitter/receiver structure of the TDD antenna apparatus according to an embodiment of the present disclosure. Referring to FIGS. 2 and 3, the TDD antenna apparatus 100 includes a transmitter 110, a receiver 120, and a controller 130 controlling the transmitter 110 and the receiver 120 according to the TDD method.

The transmitter 110 includes at least one transmission antenna module. The receiver 120 includes at least one reception antenna module. In the embodiment illustrated in FIG. 3, the transmitter 110 and the receiver 120 are composed of one transmission antenna module 110a and one reception antenna module 120a, respectively, but the transmitter 110 and/or the receiver 120 may be composed of a plurality of transmission antenna modules and/or a plurality of transmission antenna modules.

In the TDD antenna apparatus 100 according to an embodiment of the present disclosure, the transmitter 110 and the receiver 120 may be implemented as circuits separated from each other. In the specification, the meaning that the transmitter 110 and the receiver 120 are "separated" from each other is not limitedly understood as being a meaning that the two circuits are separated from each other in a form not having a mutual physical coupling relation, and is a meaning that a common signal transfer line (cable) is not shared between the transmitter 110 and the receiver 120. According to an embodiment of the present disclosure, the transmitter 110 and the receiver 120 may be configured to transmit and receive a downlink signal and an uplink signal according to the TDD method through different paths P1 and P2 separated from each other.

The transmitter 110 may transmit a downlink signal through a first path P1. The receiver 120 may receive an uplink signal through a second path P2. The receiver 120 may receive the uplink signal through the second path P2 separated from the first path P1 without a portion overlapped with the first path P1 through which the downlink signal is transmitted by the transmitter 110.

The transmission antenna module 110a may include a power amplifier 112, a transmission filter 114 and at least one transmission antenna 115. The power amplifier 112 is provided on the first path P1, and may amplify power of a transmission signal to a given level or more in order to transmit a downlink signal.

A linear power amplifier (LPA), a high power amplifier (HPA), etc. may be taken as an example of the power amplifier 112, but the present disclosure is not limited thereto. Everything capable of amplifying power of a transmission signal may be used as the power amplifier 112 without special restrictions.

An operation of the power amplifier 112 may be controlled by the controller 130 depending on a downlink transmission mode or an uplink reception mode. An operation of the power amplifier 112 may be suspended (stopped) while the receiver 120 receives an uplink signal, and the power amplifier 112 may operate only while the transmitter 110 transmits a downlink signal.

The suspension of operation of the power amplifier 112 may be executed in a way to not apply an operating voltage to active elements (e.g., transistors) provided in the power amplifier 112 or to apply a voltage for suspending an operation of active elements, for example.

To the contrary to this, the power amplifier 112 may be operated in a way to apply an operating voltage to active elements (e.g., transistors) included in the power amplifier 112. However, an operation of the power amplifier 112 or the suspension of an operation thereof is not limited to such an illustrated method.

A transmission signal amplified by the power amplifier 112 may be inputted to the transmission filter 114. The transmission filter 114 may be provided on the first path P1, and may filter a frequency of the transmission signal amplified by the power amplifier 112 by using an internal resonator (not illustrated). The transmission filter 114 filters a signal having a given frequency band, so that a downlink signal may be generated.

The transmission filter 114 may be provided as a band pass filter, a band stop filter, a low pass filter, a high frequency pass filter, etc. depending on a set downlink frequency, but is not limited thereto.

The downlink signal filtered and generated by the transmission filter 114 may be inputted to the transmission antenna 115. The transmission antenna 115 may be provided on the first path P1, and may transmit, to the outside, the downlink signal filtered and generated by the transmission filter 114. The transmission antenna 115 may be provided as a dipole antenna, a mono pole antenna, etc., but is not limited thereto. All of various directional or non-directional antennas capable of transmitting a downlink signal may be used as the transmission antenna 115.

In this case, the dipole antenna refers to an antenna in which conductors consisting of two straight lines are installed in parallel and which transmits or receives a radio wave. The monopole antenna refers to an antenna that operates half the dipole antenna. Furthermore, the directional antenna refers to an antenna which duplicates or radiates a signal in a specific direction or receives a signal having a specific direction. The non-directional antenna refers to an antenna showing an omni-directional radiation pattern on a single plan without a specific direction.

The reception antenna module 120a may include at least one reception antenna 122, an LNA 123 and a reception filter 124. The reception antenna 122 may be provided on the second path P2, and may receive an uplink signal. The reception antenna 122 may be provided as a dipole antenna, a mono pole antenna, etc., but is not limited thereto. All of various directional or non-directional antennas capable of receiving an uplink signal may be used as the reception antenna 122.

An uplink signal received by the reception antenna 122 may be inputted to the LNA 123. The LNA 123 may be provided on the second path P2, and may low-noise-amplify the uplink signal received by the reception antenna 122.

An Esaki diode amplifier, a parametric amplifier, a Maser amplifier, etc. may be taken as examples of the LNA 123, but everything capable of low-noise-amplifying a reception signal may be used without special restrictions.

In an embodiment, the LNA 123 may be directly connected to an output stage of the reception antenna 122. Alternatively, the LNA 123 may be connected to the output stage of the reception antenna 122 through a signal line such as a cable.

A part, such as a filter, other than a transmission and reception switch (TDD switch) may be additionally connected between the reception antenna 122 and the LNA 123. In this case, the part, such as the filter coupled between the reception antenna 122 and the LNA 123, may be a part having a smaller size than the transmission filter 114 of the transmitter 110.

Power of a transmission signal transmitted from the transmission line of the transmitter 110 has a larger size than power of a reception signal of the reception line. Accordingly, for strict control over the transmission signal, the size of the transmission filter 114 used in the transmission line is large, but the TDD antenna apparatus according to an embodiment of the present disclosure separately uses the transmission line and the reception line. For this reason, a filter having a large size, such as the transmission filter 114, does not need to be used between the reception antenna 122 and the LNA 123.

Accordingly, although the filter is provided between the reception antenna 122 and the LNA 123, a small filter having a required size may be sufficiently used by taking into consideration an NF of a reception signal (uplink signal). A loss of a reception signal inputted from the reception stage to the LNA 123 can be reduced because the size of the filter applied between the reception antenna 122 and the LNA 123 is small.

An operation of the LNA 123 may be controlled by the controller 130 depending on a downlink transmission mode or an uplink reception mode. An operation of the LNA 123 may be suspended (stopped) while the transmitter 110 transmits a downlink signal, and the LNA 123 may operate only while the receiver 120 receives an uplink signal.

The suspension of operation of the LNA 123 may be executed in a way to not apply an operating voltage to active elements (e.g., transistors) provided in the LNA 123 or to apply a voltage for suspending an operation of active elements, for example.

To the contrary to this, the LNA 123 may be operated in a way to apply an operating voltage to active elements (e.g., transistors) included in the LNA 123. However, an operation of the LNA 123 or the suspension of an operation thereof is not limited to such an illustrated method.

The uplink signal low-noise-amplified by the LNA 123 may be inputted to the reception filter 124. The reception filter 124 may be provided on the second path P2, and may filter a frequency of the uplink signal low-noise-amplified by the LNA 123 by using an internal resonator (not illustrated). The reception filter 124 may be provided as a band pass filter, a band stop filter, a low pass filter, a high frequency pass filter, etc. depending on a set uplink frequency, but is not limited thereto.

In an embodiment of the present disclosure, the LNA 123 may be disposed between the reception antenna 122 and the reception filter 124 along the second path P2 along which an uplink signal is received. A conventional transmission and reception switch (TDD switch) may not be provided on the second path P2 of the receiver 120.

According to such an arrangement structure of the reception antenna 122, the LNA 123 and the reception filter 124, a filter, a transmission and reception switch (TDD switch), etc. are not disposed between the reception antenna 122 and the LNA 123, and the LNA 123 can be disposed at a distance close to the reception antenna 122. Accordingly, a distance between the reception antenna 122 and the LNA 123 along the second path P2 can be minimized.

In an embodiment, the distance between the reception antenna 122 and the LNA 123 along the second path P2 may be provided shorter than the distance between the transmission antenna 115 and the power amplifier 112 along the first path P1. Furthermore, the distance between the reception antenna 122 and LNA 123 of the receiver 120 may be provided shorter than the distance between the transmission antenna 115 and transmission filter 114 of the transmitter 110.

If the LNA 123 is directly coupled with the output stage of the reception antenna 122 without using a cable, the distance between the reception antenna 122 and the LNA 123 may become 0. In this case, a reception signal inputted to the LNA 123 may maintain its original signal without any change or may include only minimum noise.

According to an embodiment of the present disclosure, antenna performance can be improved because a signal loss from the reception antenna 122 to a front end of the LNA 123 is minimized and thus an NF of the entire system is improved. A detailed structure of the receiver 120 is more specifically described with reference to the embodiment of FIG. 4.

The controller 130 may process an internal signal and transmit the processed signal to the outside through the transmitter 110. Furthermore, the controller 130 may process a signal received through the receiver 120, and may transfer given information included in the received signal to an apparatus connected to the antenna apparatus. The controller 130 may control operations of the power amplifier 112 of the transmitter 110 and the LNA 123 of the receiver 120 depending on whether a downlink signal is transmitted or an uplink signal is received.

Upon transmission of a downlink signal, the controller 130 may operate the power amplifier 112 of the transmitter 110 and simultaneously suspend an operation of the LNA 123 of the receiver 120. Furthermore, upon reception of an uplink signal, the controller 130 may suspend an operation of the power amplifier 112 of the transmitter 110 and simultaneously operate the LNA 123 of the receiver 120.

Figure 4:
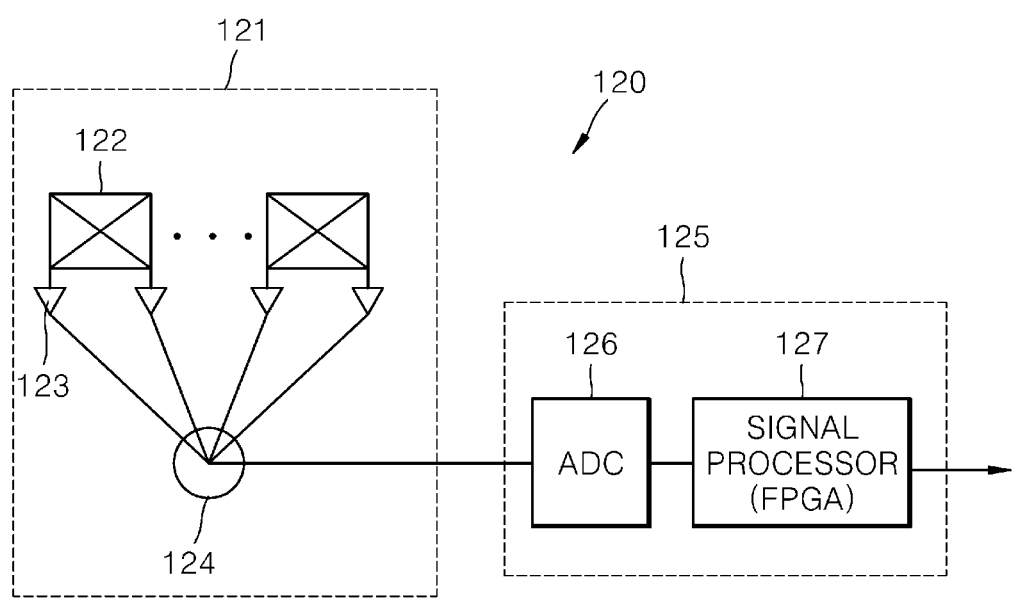
FIG. 4 is a configuration diagram of a receiver constituting the time-division duplex antenna apparatus according to an embodiment of the present disclosure.

FIG. 4 is a configuration diagram of a receiver constituting the TDD antenna apparatus according to an embodiment of the present disclosure. Referring to FIG. 4, the receiver 120 may include a reception antenna module 121 and a signal processing unit 125. First, the reception antenna module 121 may include the at least one reception antenna 122, the LNA 123 and the reception filter 124.

The at least one reception antenna 122 may receive an external signal, and may output the external signal to the LNA 123 of the reception antenna module 121. The reception antenna 122 may be implemented as a patch antenna, for example.

The LNA 123 may be disposed to correspond to each reception antenna 122. Each LNA 123 is connected to an output stage of a corresponding reception antenna 122, and may amplify a reception signal outputted by the corresponding reception antenna 122.

In this case, as the LNA 123 is connected to the output stage of the reception antenna 122, the reception signal inputted to the LNA 123 may maintain its original signal without any change or may include only minimum noise.

Each LNA 123 may amplify a reception signal received from a corresponding reception antenna 122, and may output the reception signal to the reception filter 124. In this case, the reception filter 124 may filter the reception signal, amplified by the LNA 123, as a signal having a reception frequency band, and may transfer the signal to the signal processing unit 125. The signal processing unit 125 may be connected to the reception antenna module 121 through a cable.

The signal processing unit 125 may include an analog-to-digital (AD) converter 126 and a signal processor 127. When receiving a signal filtered by the reception filter 124 through the cable, the AD converter 126 may convert, into a digital signal, the received reception signal having an analog form.

The AD converter 126 may transfer the converted digital signal to the signal processor 127. In this case, a field programmable gate array (FPGA) may correspond to the signal processor 127. Even in addition, any circuit structure for processing a signal of an antenna receiver may correspond to the signal processor 127. The signal processor 127 may output, to the controller 130, the digital signal converted by the AD converter 126.

Figure 5:
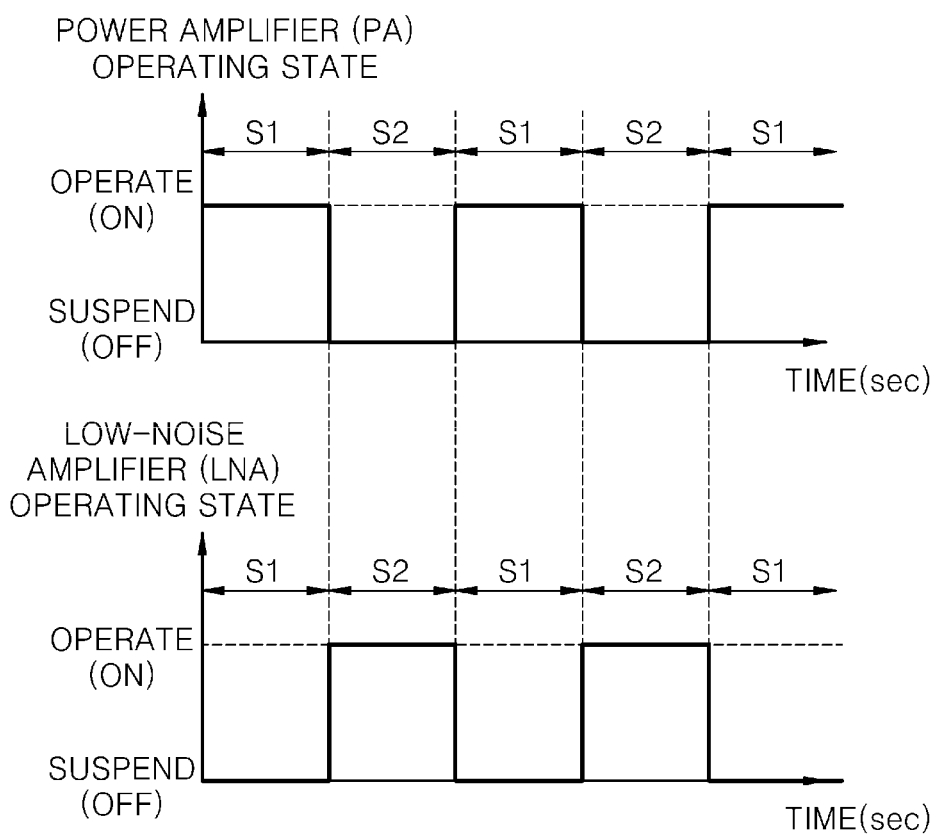
FIG. 5 is a diagram for describing an operation of the time-division duplex antenna apparatus according to an embodiment of the present disclosure.

FIG. 5 is a diagram for describing an operation of the TDD antenna apparatus according to an embodiment of the present disclosure. Referring to FIGS. 2 to 4 and 5, upon transmission (S1) of a downlink signal, the controller 130 may operate the power amplifier 112 of the transmitter 110 and suspend an operation of the LNA 123 of the receiver 120. Upon reception (S2) of an uplink signal, the controller 130 may suspend an operation of the power amplifier 112 of the transmitter 110 and operate the LNA 123 of the receiver 120. In an embodiment, the controller 130 may recognize whether a signal transmitted by a service provider is a transmission signal or a reception signal based on a size (e.g., 0 to 3.3 V) of the signal, may operate parts corresponding to the transmitter 110 when receiving a signal having a transmission signal size, and may operate parts corresponding to the receiver 120 when receiving a signal having a reception signal size.

In an embodiment, as illustrated in FIG. 5, upon mode change between downlink transmission and uplink reception, the controller 130 may simultaneously change operations of the power amplifier 112 and the LNA 123 in synchronization with control commands from the power amplifier 112 and the LNA 123.

In another embodiment of the present disclosure, the controller 130 may control timings of control commands of the power amplifier 112 and the LNA 123 so that the changes of operations of the power amplifier 112 and the LNA 123 are performed at different timing. For example, in order to minimize an interference phenomenon in which a downlink signal transmitted by the transmitter 110 is reflected by various surrounding environments and inputted to the receiver 120, upon mode change from downlink transmission (S1) to uplink reception (S2), the controller 130 may suspend an operation of the power amplifier 112 and then operate the LNA 123 after a lapse of a set time $\Delta T$ from timing at which the operation of the power amplifier 112 was suspended.

The set time ΔT that determines a time difference between the timing at which the operation of the power amplifier 112 is suspended and the timing at which the operation of the LNA 123 is started may be calculated from timing at which a level of an interference signal generated as a downlink signal is inputted to the receiver 120 is less than a preset reference interference level, for example. For another example, while variously changing a time interval between timing at which an operation of the power amplifier 112 is suspended and timing at which an operation of the LNA 123 is started, the controller 130 may measure an interference level between a transmission signal and a reception signal in the receiver 120 and/or an NF of the reception signal, and may calculate the set time ΔT from timing at which the interference level between the transmission signal and the reception signal in the receiver 120 is less than the reference interference level or timing at which the NF of the reception signal becomes a minimum, etc.

Figure 6:
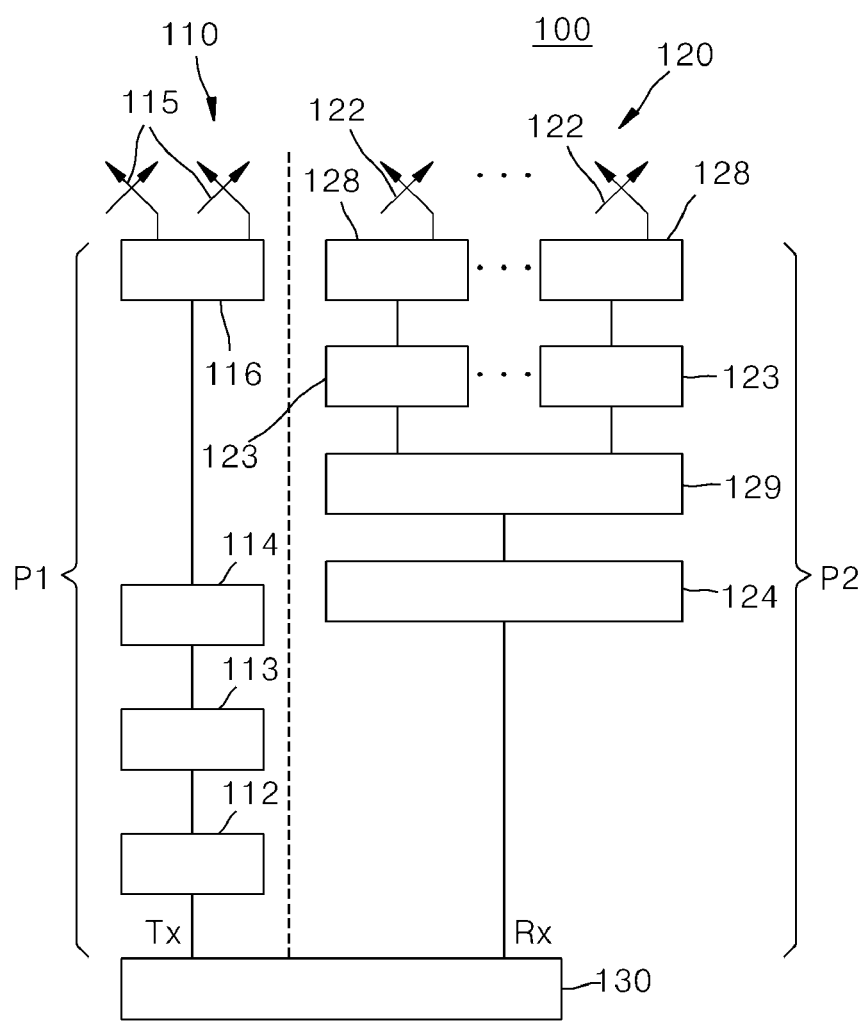
FIG. 6 is a configuration diagram of a time-division duplex antenna apparatus according to another embodiment of the present disclosure.

FIG. 6 is a configuration diagram of a TDD antenna apparatus according to another embodiment of the present disclosure. In describing the embodiment illustrated in FIG. 6, a redundant description of an element identical with or corresponding to that of the aforementioned embodiment may be omitted. A TDD antenna apparatus 100 according to the embodiment illustrated in FIG. 6 is different from the aforementioned embodiment in that the receiver 120 further includes a filter 128 and a combiner 129.

Referring to FIGS. 2 and 6, the reception antenna module of the receiver 120 may include a reception antenna 122 in plural. The plurality of reception antennas 122 may constitute an array antenna. The combiner 129 may be provided between the LNA 123 and the reception filter 124 along the second path P2 of the receiver 120. The combiner 129 may combine a plurality of uplink signals received by the plurality of reception antennas 122. The LNA 123 may be provided between each of the reception antennas 122 and the combiner 129 along the second path P2.

The filter 128 may be provided between each of the reception antennas 122 and the LNA 123 along the second path P2. In an embodiment, the filter 128 may be configured to prevent the saturation of the LNA 123 which may occur when a signal according to a 3rd Generation Partnership Project (3GPP) out of band blocking standard is applied, for example.

The reception filter 124 may be provided between an output stage of the combiner 129 and the controller 130 along the second path P2. The reception filter 124 may be configured to block an out-of-band signal against a reception signal outputted from a plurality of uplink signals combined by the combiner 129.

The transmission antenna module of the transmitter 110 may include a transmission antenna 115 in plural. The plurality of transmission antennas 115 may constitute an array antenna. The divider 116 may divide power of a downlink signal and divide and output the power to the plurality of transmission antenna 115. An isolator may be provided between the power amplifier 112 and the transmission filter 114.

In the TDD antenna apparatus 100 according to the embodiment of FIG. 6, a transmission and reception switch (TDD switch) is not disposed between the reception antenna 122 and the LNA 123. Accordingly, since the LNA 123 may be disposed at a distance close to the reception antenna 122, the distance between the reception antenna 122 and the LNA 123 along the second path P2 can be minimized.

In an embodiment, a distance between the reception antenna 122 and the LNA 123 along the second path P2 may be provided shorter than a distance between the transmission antenna 115 and the power amplifier 112 along the first path P1. Accordingly, antenna performance can be improved because a signal loss from the reception antenna 122 to the front end of the LNA 123 is minimized and thus an NF of the entire system is improved.

The transmission filter 114 of the transmitter 110 needs to be designed to have a large size in order to filter a transmission signal having relatively high power, but the filter 128 provided between the reception antenna 122 and the LNA 123 may be designed to have a smaller size than the transmission filter 114 used in the transmitter 110. Accordingly, in the embodiment of FIG. 6, the distance between the LNA 123 and reception antenna 122 of the receiver 120 may be designed shorter than the distance between the transmission antenna 115 and power amplifier 112 of the transmitter 110.

According to the embodiment of FIG. 6, in order to reduce an NF, an NF at the front end of the LNA 123 can be reduced by adding the filter 128 at the front end of the LNA 123 of the receiver 120. An NF of a combined uplink signal amplified by multiple LNAs 123 can be reduced and a digital stage of the controller 130 can be protected against noise by adding the reception filter 124 between the rear end of the LNA 123 and the front end of the controller 130. Accordingly, there is an effect in that all of NFs at the front/rear ends of the LNA 123 and NFs at the front end of digital stage of the controller 130 can be effectively reduced by a two-stage filter consisting of the filter 128 and the reception filter 124.

In the case of a conventional TDD antenna apparatus, a filter having a large size is inevitably used based on a transmission line because power of the transmission line is great and a standard for the transmission line is more strict than that for a reception line, Accordingly, there is a disadvantage in that a signal loss at a reception stage is great. However, according to an embodiment of the present disclosure, there is provided an advantage in that a signal loss at the reception stage can be reduced because the transmission line and the reception line are separately used and thus a filter having a required size has only to be used in the reception line by taking into consideration an NF of a reception signal (uplink signal).

Figure 7:
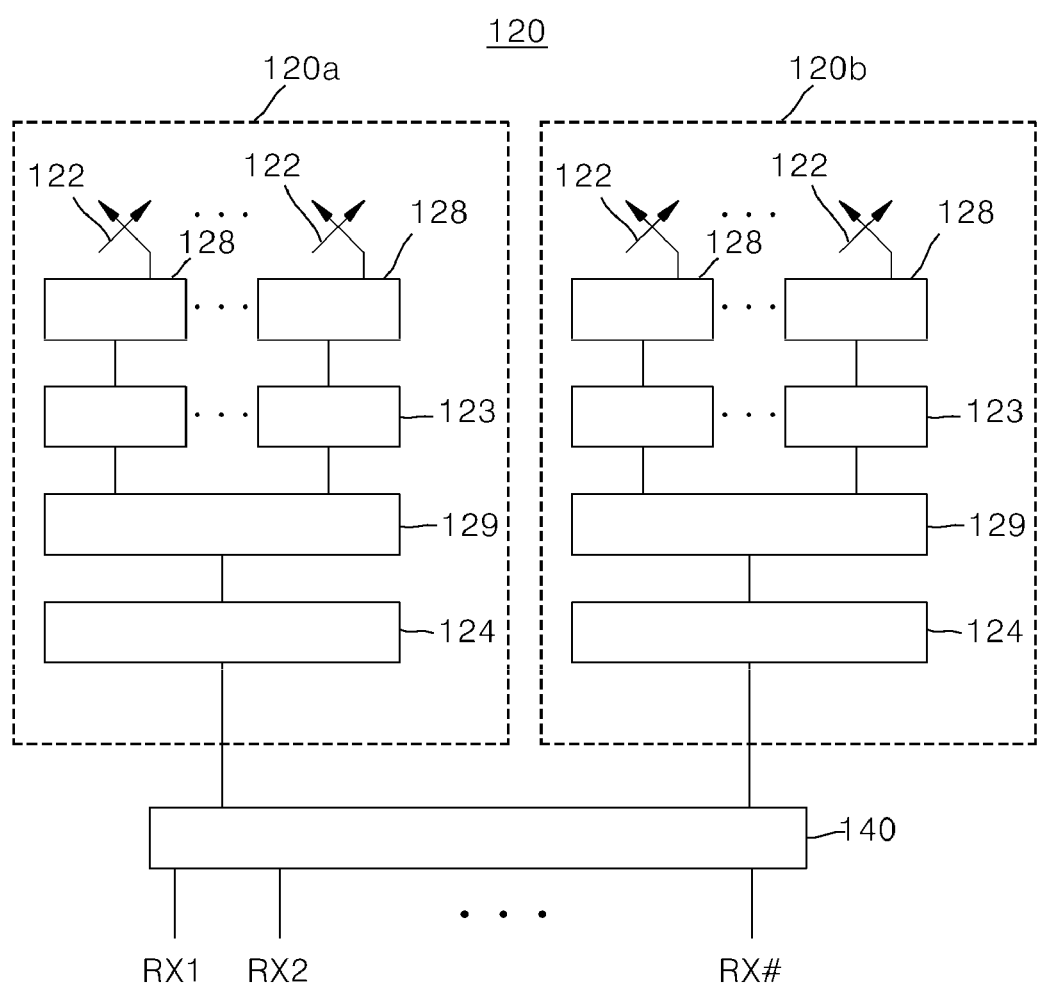
FIG. 7 is a configuration diagram of a receiver constituting a time-division duplex antenna apparatus according to still another embodiment of the present disclosure.

FIG. 7 is a configuration diagram of a receiver constituting a TDD antenna apparatus according to still another embodiment of the present disclosure. In describing the embodiment illustrated in FIG. 7, a redundant description of an element identical with or corresponding to that of the aforementioned embodiment may be omitted. A TDD antenna apparatus 100 according the embodiment illustrated in FIG. 7 is different from the aforementioned embodiments in that the receiver 120 includes reception antenna modules 120a and 120b in plural and further includes a Butler matrix 140.

In this case, the Butler matrix 140 is used to divide one input signal into N signals or to combine N input signals for one output terminal. A microstrip line, a strip line, a coaxial line, a wave guide, etc. is used in the Butler matrix depending on the size of a transmitted signal.

Referring to FIGS. 2 and 7, the Butler matrix 140 may be provided between the plurality of reception antenna modules 120a and 120b and the controller 130 along the second path P2. The Butler matrix 140 may be configured to include a hybrid coupler and a phase shifter. The Butler matrix 140 is a structure which enables beamforming by using multiple hybrid couplers. A switch is disposed at the front end of the Butler matrix, and one antenna radiation pattern corresponding to one port is determined when the one port is selected.

Steering power of a reception beam can be obtained or a multi-beam characteristic can be obtained because the Butler matrix 140 combines a plurality of reception signals generated by the plurality of reception antenna modules 120a and 120b, and an antenna gain can be increased. All of various types, such as a 2×2 matrix, a 4×4 matrix or an 8×8 matrix, may be used as the Butler matrix 140.

In the receiver of the TDD antenna apparatus according to an embodiment of the present disclosure, the reception antenna and the LNA are not connected through a cable, and the LNA can be directly connected to the output stage of the reception antenna. In this case, an NF of a reception signal inputted to the LNA is 1.6 dB which is reduced 4 dB compared to the conventional TDD antenna apparatus. Accordingly, a gain of the reception antenna can be improved 1.5 dB. According to an embodiment of the present disclosure, an effect in that uplink coverage of about 1.68 times in the distance and about 2.82 times in the area is improved compared to the conventional antenna apparatus can be obtained.

The aforementioned embodiments may be implemented as a hardware component, a software component and/or a combination of hardware and software components. For example, the apparatus, the method, and some (e.g., the signal processing unit, the signal processor, and the controller) of the elements described in the embodiments may be implemented using one or more general-purpose computers or special-purpose computers, for example, a processor, a controller, an arithmetic logic unit (ALU), a digital signal processor, a microcomputer, a field programmable gate array (FPGA), a programmable logic unit (PLU), a microprocessor or any other device capable of executing or responding to an instruction.

The processor may perform an operating system (OS) and one or more software applications executed on the OS. Furthermore, the processor may access, store, manipulate, process and generate data in response to the execution of software. For convenience of understanding, one processor has been illustrated as being used, but a person having ordinary knowledge in the art may understand that the processor may include a plurality of processing elements and/or a plurality of types of processing elements.

For example, the processor may include a plurality of processors or one processor and one controller. Furthermore, other processing configurations, such as a parallel processor, are also possible. Software may include a computer program, a code, an instruction or a combination of one or more of them, and may configure a processor so that it operates as desired or may instruct processors independently or collectively.

Software and/or data may be temporarily or permanently embodied in any type of a machine, component, physical device, virtual equipment, or computer storage medium or device or a transmitted signal wave so as to be interpreted by the processor or to provide an instruction or data to the processor. The software may be distributed to computer systems connected over a network and may be stored or executed in a distributed manner. The software and data may be stored in one or more computer-readable recording media. The above description is merely a description of the technical spirit of the present disclosure, and those skilled in the art may change and modify the present disclosure in various ways without departing from the essential characteristic of the present disclosure. Accordingly, the embodiments described in the present disclosure should not be construed as limiting the technical spirit of the present disclosure, but should be construed as describing the technical spirit of the present disclosure. The technical spirit of the present disclosure is not restricted by the embodiments. The range of protection of the present disclosure should be construed based on the following claims, and all of technical spirits within an equivalent range of the present disclosure should be construed as being included in the scope of a right of the present disclosure.

INDUSTRIAL APPLICABILITY

In the receiver of the TDD antenna apparatus according to an embodiment of the present disclosure, the reception antenna and the LNA are not connected through a cable, and the LNA can be directly connected to the output stage of the reception antenna. In this case, an NF of a reception signal inputted to the LNA is 1.6 dB which is reduced 4 dB compared to the conventional TDD antenna apparatus. Accordingly, a gain of the reception antenna can be improved 1.5 dB. According to an embodiment of the present disclosure, an effect in that uplink coverage of about 1.68 times in the distance and about 2.82 times in the area is improved compared to the conventional antenna apparatus can be obtained.

What is claimed is:

1. A time-division duplex (TDD) antenna apparatus transmitting and receiving a downlink signal and an uplink signal, comprising:
   a transmitter comprising at least one transmission antenna module and configured to transmit a downlink signal through a first path;
   a receiver comprising at least one reception antenna module and configured to receive an uplink signal through a second path separated from the first path without a portion overlapped with the first path; and
   a controller configured to control the transmitter and the receiver,
   wherein:
   the transmission antenna module comprises:
   a power amplifier provided on the first path and configured to amplify power of a transmission signal;
   a transmission filter provided on the first path and configured to generate the downlink signal by filtering a frequency of the transmission signal amplified by the power amplifier; and
   at least one transmission antenna provided on the first path and configured to transmit the downlink signal filtered and generated by the transmission filter, and
   wherein the reception antenna module comprises:
      at least one reception antenna provided on the second path and configured to receive the uplink signal;
      a low noise amplifier provided on the second path and configured to low-noise-amplify the uplink signal received by the reception antenna; and
      a reception filter provided on the second path and configured to filter a frequency of the uplink signal low-noise-amplified by the low noise amplifier, and
      wherein the low noise amplifier is disposed between the reception antenna and the reception filter along the second path along which the uplink signal is received, and
   wherein a distance between the reception antenna and the low noise amplifier along the second path is shorter than a distance between the transmission antenna and the power amplifier along the first path.

2. The TDD antenna apparatus of claim 1, wherein:
   the reception antenna module comprises a plurality of reception antennas, including the reception antenna, the reception antenna module further comprises a combiner provided between the low noise amplifier and the reception filter along the second path and configured to combine a plurality of uplink signals received by the plurality of reception antennas, and the low noise amplifier is provided between each of the plurality of reception antennas and the combiner along the second path.

3. The TDD antenna apparatus of claim 2, wherein the reception antenna module further comprises a filter provided between each of the reception antennas and the low noise amplifier along the second path and configured to prevent a saturation of the low noise amplifier.

4. The TDD antenna apparatus of claim 3, wherein the reception filter is provided between an output stage of the combiner and the controller along the second path and configured to block an out-of-band signal against a reception signal outputted from the plurality of uplink signals combined by the combiner.

5. The TDD antenna apparatus of claim 2, wherein
the receiver comprises the reception antenna modules in plural, and
the receiver further comprises a Butler matrix provided between the plurality of reception antenna modules and the controller along the second path and configured to form a multi-beam by combining a plurality of reception signals generated by the plurality of reception antenna modules.

6. The TDD antenna apparatus of claim 2, wherein the receiver does not comprise a transmission and reception switch for controlling the transmitter and the receiver according to the TDD method on the second path.

7. The TDD antenna apparatus of claim 2, wherein the receiver is composed of a separate circuit separated from the transmitter.

8. The TDD antenna apparatus of claim 1, wherein the controller is configured to:
operate the power amplifier and suspend an operation of the low noise amplifier upon transmission of the downlink signal; and
suspend an operation of the power amplifier and operate the low noise amplifier upon reception of the uplink signal.

9. The TDD antenna apparatus of claim 1, wherein the low noise amplifier is directly connected to an output stage of the reception antenna.

10. A time-division duplex (TDD) antenna apparatus transmitting and receiving a downlink signal and an uplink signal, comprising:
a transmitter comprising a transmission antenna module and configured to transmit a downlink signal through a first path;
a receiver comprising a reception antenna module and configured to receive an uplink signal through a second path separated from the first path without a portion overlapped with the first path; and
a controller configured to control the transmitter and the receiver,
wherein:
the transmission antenna module comprises:
a power amplifier provided on the first path and configured to amplify power of a transmission signal;
a transmission filter provided on the first path and configured to generate the downlink signal by filtering a frequency of the transmission signal amplified by the power amplifier; and
at least one transmission antenna provided on the first path and configured to transmit the downlink signal filtered and generated by the transmission filter, and
wherein the reception antenna module comprises:
a plurality of reception antennas provided on the second path and configured to receive the uplink signal;
a low noise amplifier provided on the second path and configured to low-noise-amplify the uplink signal received by the plurality of reception antennas; and
a reception filter provided on the second path and configured to filter a frequency of the uplink signal low-noise-amplified by the low noise amplifier, and
wherein the low noise amplifier is disposed between the plurality of reception antennas and the reception filter along the second path along which the uplink signal is received,
wherein:
the reception antenna module further comprises a combiner provided between the low noise amplifier and the reception filter along the second path and configured to combine a plurality of uplink signals received by the plurality of reception antennas, and
the low noise amplifier is provided between each of the plurality of reception antennas and the combiner along the second path.

11. The TDD antenna apparatus of claim 10, wherein the reception antenna module further comprises a filter provided between each of the plurality of reception antennas and the low noise amplifier along the second path and configured to prevent a saturation of the low noise amplifier.

12. The TDD antenna apparatus of claim 11, wherein the reception filter is provided between an output stage of the combiner and the controller along the second path and configured to block an out-of-band signal against a reception signal outputted from the plurality of uplink signals combined by the combiner.

13. The TDD antenna apparatus of claim 10, wherein
The receiver comprises a plurality of reception antenna modules, including the reception antenna module, and
the receiver further comprises a Butler matrix provided between the plurality of reception antenna modules and the controller along the second path and configured to form a multi-beam by combining a plurality of reception signals generated by the plurality of reception antenna modules.

14. The TDD antenna apparatus of claim 10, wherein the receiver does not comprise a transmission and reception switch for controlling the transmitter and the receiver according to the TDD method on the second path.

15. The TDD antenna apparatus of claim 10, wherein the receiver is composed of a separate circuit separated from the transmitter.

16. The TDD antenna apparatus of claim 10, wherein the controller is configured to:
operate the power amplifier and suspend an operation of the low noise amplifier upon transmission of the downlink signal; and
suspend an operation of the power amplifier and operate the low noise amplifier upon reception of the uplink signal.

17. The TDD antenna apparatus of claim 10, wherein the low noise amplifier is directly connected to an output stage of the plurality of reception antennas.

* * * * *